(12) United States Patent
Baines

(10) Patent No.: US 8,971,198 B2
(45) Date of Patent: *Mar. 3, 2015

(54) METHOD OF CONTROLLING A COMMUNICATIONS LINK

(76) Inventor: Steven John Baines, Bishops Stortford (GB)

(*) Notice: Subject to any disclaimer, the term of this patent is extended or adjusted under 35 U.S.C. 154(b) by 0 days.

This patent is subject to a terminal disclaimer.

(21) Appl. No.: 13/437,622

(22) Filed: Apr. 2, 2012

(65) Prior Publication Data

US 2012/0189039 A1 Jul. 26, 2012

Related U.S. Application Data

(63) Continuation of application No. 10/213,729, filed on Aug. 6, 2002, now Pat. No. 8,179,864.

(51) Int. Cl.
*H04L 1/20* (2006.01)
*H04L 12/26* (2006.01)
*H04L 1/00* (2006.01)
*H04L 1/06* (2006.01)

(52) U.S. Cl.
CPC ............ *H04L 1/0029* (2013.01); *H04L 1/0003* (2013.01); *H04L 1/0009* (2013.01); *H04L 1/0618* (2013.01)
USPC .......................................... 370/252; 370/465

(58) Field of Classification Search
USPC ......... 370/229, 235, 236, 249, 252, 328–329, 370/332, 334, 437, 465, 468, 230, 330
See application file for complete search history.

(56) References Cited

U.S. PATENT DOCUMENTS

| 6,317,466 | B1 | 11/2001 | Foschini |
| 6,701,129 | B1 | 3/2004 | Hashem et al. |
| 6,754,169 | B2 | 6/2004 | Baum et al. |
| 6,760,882 | B1 * | 7/2004 | Catreux et al. ............... 714/774 |
| 7,120,199 | B2 * | 10/2006 | Thielecke et al. ............ 375/267 |

(Continued)

FOREIGN PATENT DOCUMENTS

| EP | 1 187 385 A1 | 3/2002 |
| WO | 99/62212 A2 | 12/1999 |

OTHER PUBLICATIONS

Examination report dated Jul. 19, 2010 in corresponding Canadian application 2,436,646, pp. 1-3.

(Continued)

*Primary Examiner* — Michael Thier
*Assistant Examiner* — Feben M Haile
(74) *Attorney, Agent, or Firm* — Womble Carlyle Sandridge & Rice, LLP

(57) ABSTRACT

The present invention is directed to a method of controlling a communications link and apparatus configured to perform this method. This invention is particularly related to but in no way limited to MIMO (multiple inputs multiple outputs) wireless communications systems. The method comprises the steps of determining at the receiver the quality of the communications link and based on this, selecting a group of transmission parameters and an element from this group. These selections are then communicated to the transmitter. The transmission parameter may be the transmission configuration such as the modulation and coding scheme. The invention minimises the required feedback signalling from the receiver to the transmitter by exploiting temporal correlation of the parameter being controlled, whilst allowing rapid selection of the parameter.

16 Claims, 4 Drawing Sheets

(56) References Cited

U.S. PATENT DOCUMENTS

| | | |
|---|---|---|
| 7,206,332 B2 | 4/2007 | Kwan et al. |
| 7,386,277 B2 * | 6/2008 | Cho et al. .................. 455/69 |
| 7,787,530 B2 | 8/2010 | Gollamudi et al. |
| 2002/0141377 A1 | 10/2002 | Baker et al. |
| 2002/0172166 A1 | 11/2002 | Arslan et al. |
| 2002/0183010 A1 * | 12/2002 | Catreux et al. ............. 455/67.1 |
| 2004/0171385 A1 | 9/2004 | Haustein et al. |
| 2013/0039310 A1 * | 2/2013 | Hsu et al. .................. 370/329 |

OTHER PUBLICATIONS

3GPP TSG RAN WG1 Lucent Technologies, "Increasing MIMO throughout with per-antenna rate control", Aug. 2001.

* cited by examiner

METHOD OF CONTROLLING A COMMUNICATIONS LINK

FIELD OF THE INVENTION

The present invention relates to a method of controlling a communications link and apparatus configured to perform this method. This invention is particularly related to but in no way limited to MIMO (multiple inputs multiple outputs) wireless communications systems.

BACKGROUND TO THE INVENTION

A MIMO wireless communication system, as shown in FIG. 1, is one which comprises a plurality of antennas 10 at the transmitter 11 and one or more antennas 12 at the receiver 13. The antennas 10, 12 are employed in a multipath rich environment such that due to the presence of various scattering objects (buildings, cars, hills, etc.) in the environment, each signal experiences multipath propagation. Thus a cloud shape 14 is shown in FIG. 1 to represent the scattered signals between the transmit and receive antennas. User data is transmitted from the transmit antennas using a space-time coding (STC) transmission method as is known in the art. The receive antennas 12 capture the transmitted signals and a signal processing technique is then applied as known in the art, to separate the transmitted signals and recover the user data.

MIMO wireless communication systems are advantageous in that they enable the capacity of the wireless link between the transmitter and receiver to be improved compared with previous systems in the respect that higher data rates can be obtained. The multipath rich environment enables multiple orthogonal channels to be generated between the transmitter and receiver. Data for a single user can then be transmitted over the air in parallel over those channels, simultaneously and using the same bandwidth. Consequently, higher spectral efficiencies are achieved than with non-MIMO systems. Channel SNIR (Signal to Noise and Interference Ratio) can also be improved via use of beamforming.

Lucent have proposed a MIMO technique called Per-Antenna Rate Control (PARC) which is described in the document 'Increasing MIMO throughput with per-antenna rate control', 3GPP TSG-R1#21(01)0879, 27-31 Aug. 2001, Turin, Italy.

PARC differs from previous MIMO techniques such as code reuse and differential space-time transmit diversity, in that modulation and coding schemes (MCS) and hence data rates on each transmitter antenna may be different. Adaptive Modulation and Coding (AMC) is also used, in that the MCS can be changed whilst the communication link is active in order to react to changes in channel performance. A benefit of the PARC technique is that by introducing flexibility in the data rate on each antenna, the overall throughput of the system in increased. The decision regarding which MCS to use is made at the receiver on the basis of a performance evaluation on the downlink (received) signal, e.g. on the basis of the SNIR (Signal to Noise and Interference Ratio). It is therefore necessary for the receiver to signal to the transmitter via the uplink to request the chosen MCS. The receiver sends a corresponding identification number via a feedback subchannel to the transmitter. Given that there are multiple antennas and multiple MCS, there are potentially a very large number of combinations which could be chosen. However, there is limited feedback capacity within the uplink and the larger the number of combinations, the larger the number of bits which are required on the uplink to indicate the chosen MCS combination (or configuration).

Lucent propose, therefore, that a limited set of MCS combinations are used. The limited set of MCS combinations are chosen such that throughput is maximised for a given geometry and given maximum acceptable frame error rate (FER). Typically the number of MSC combinations is limited to 32 or fewer which means that they can be indexed by 5 bits per transmission time interval (TTI).

One of the problems with this approach is that certain MCS configurations which may be useful are not available as they are not included within the fixed set, even though the transmitter is physically capable of using them.

OBJECT TO THE INVENTION

The invention seeks to provide a method for controlling a communications link which mitigates at least one of the problems of known methods.

Further benefits and advantages of the invention will become apparent from a consideration of the following detailed description given with reference to the accompanying drawings, which specify and show preferred embodiments of the invention.

SUMMARY OF THE INVENTION

The invention is directed to a method of controlling a communications link comprising the steps of:
determining at a receiver the quality of said link from a transmitter;
based on said quality determination, selecting from a plurality of transmission parameters, a group of transmission parameters and a parameter from said group, wherein each said group and each said parameter has an identification label; and
communicating to said transmitter the identification labels for said selected group and said selected parameter from said group.

An advantage of the present invention is that it allows the transmitter to use all possible transmission parameters (or transmission configurations) whilst minimising the amount of data which is required to be sent from the receiver to identify the required transmission parameters. This is particularly important in MIMO wireless systems in which there are many antennas on the transmitter, each of which may use a different MCS, and hence there are many possible transmission combinations, and also in which there is limited uplink feedback capacity. Additionally, when using AMC, the MCS may change whilst the link is active in order to react to changes in channel performance.

Another advantage of the present invention is that because the optimum transmission parameter can be chosen, the communications link capacity is increased.

A further advantage of the present invention is that the link is more robust. As the transmission parameters can be arranged into groups, such that each group contains the useful parameters for given link conditions, if there is an error in the transmission or receipt of the choice of parameter, only those within the group would be used instead. Other parameters within the group are more likely to still provide useful throughput than a totally randomly selected parameter.

Another advantage of the present invention is that because it reduces the amount of feedback required to select a transmission parameter, it is possible to obtain more timely feedback without impacting the feedback requirement of the system. This is particularly advantageous within a mobile wireless environment as network elements can be moving and the link conditions can be constantly changing.

The method of controlling a communications link may further comprise the step of:

based on said communicated identification labels, determining at the transmitter, a modulation and coding scheme to be used for said link.

At least one of the parameters within the group may represent a command to request change of group.

Preferably, the identification label for said selected group is only communicated when there is a change in said selected group.

An advantage of using parameters within the group to represent the change of group command is that the signalling overhead is reduced further. The link is still controlled by a selection of a group and a parameter from said group, however, the selection of the group may be separated in time from the selection of the parameter and the selection of the parameter may be made more frequently than the selection of the group.

The communications link may be a wireless link or an optical link.

The transmitter may be a base station and the receiver may be a handset.

The transmitter and receiver may both be handsets. This may be in an ad-hoc communications system.

The invention is further directed to a method of operating a receiver to control a communications link, said method comprising the steps of:

determining the quality of said link from a transmitter;

based on said quality determination, selecting from a plurality of transmission parameters a group of transmission parameters and a parameter from said group, wherein each said group and each said parameter has an identification label; and communicating to said transmitter the identification labels for said selected group and said selected parameter from said group.

The transmission parameter may be a modulation and coding scheme.

At least one of the parameters within the group may represent a command to request change of group.

Preferably, the identification label for said selected group is only communicated when there is a change in said selected group.

The communications link may be a wireless link or an optical link.

In a wireless link, the receiver may be a handset. The transmitter may be a base station. Both the transmitter and the receiver may both be handsets.

The invention is also directed to a method of operating a transmitter to control a communications link, said method comprising the steps of:

receiving from a receiver a first and a second identification label;

determining from said first identification label, a group of transmission parameters and from said second identification label, a parameter from said group; and using said transmission parameter for said communications link.

Preferably, said first identification label is only received when there is a change in said selected group.

The transmission parameter may be a modulation and coding scheme.

The communications link may be a wireless link or an optical link.

The transmitter may be a base station and the receiver may be a handset. Both the transmitter and the receiver may be handsets.

The invention is also directed to a network element comprising:

a receiver which is configured to receive a signal from a second network element via a communications link;

a memory in which is stored a plurality of elements representing transmission parameters, said plurality being divided into groups, each group containing a number of elements, wherein each said group and each said element has an identification label;

a processor which in use is capable of determining the quality of said link from said received signal, and based on said quality determination is configured to select a group and an element from said group; and a transmitter which is configured to communicate the identification labels for said selected group and said selected element to said second network element.

Preferably, the identification label for said selected group is only communicated when there is a change in said selected group.

Preferably, the communications link is a wireless link.

The network element may be a handset and the second network element may be a base station.

The transmission parameter may be a modulation and coding scheme.

The invention is also directed to a network element comprising:

a transmitter which is configured to communicate a signal to a second network element via a communications link;

a memory in which is stored a plurality of transmission parameters, said plurality being divided into groups, each group containing a number of transmission parameters;

a receiver which is configured to receive a signal from said second network element, said signal comprising an identification label for a group and an identification label for a parameter from said group; and a processor which is configured to determine from said signal and said memory the selected transmission parameter and to communicate said selected parameter to said transmitter, whereby the transmitter uses said selected parameter for a next signal to said second network element.

Preferably, the identification label for said selected group is only received when there is a change in said selected group.

The communications link may be a wireless link.

In a wireless link, the network element may be a base station, the second network element may be a handset and the transmission parameter may be a modulation and coding scheme.

The invention is further directed to a communications system comprising a first and a second network element having a communications link between them, said first network element comprising:

a receiver which is configured to receive a signal from a second network element via a communications link;

a memory in which is stored a plurality of elements representing transmission parameters, said plurality being divided into groups, each group containing a number of elements, wherein each said group and each said element has an identification label;

a processor which in use is capable of determining the quality of said link from said received signal, and based on said quality determination is configured to select a group and an element from said group; and a transmitter which is configured to communicate the identification labels for said selected group and said selected element to said second network element.

and said second network element comprising:

a transmitter which is configured to communicate a signal to a second network element via a communications link;

a memory in which is stored a plurality of transmission parameters, said plurality being divided into groups, each group containing a number of transmission parameters;

a receiver which is configured to receive a signal from said second network element, said signal comprising an identification label for a group and an identification label for a parameter from said group; and a processor which is configured to determine from said signal and said memory the selected transmission parameter and to communicate said selected parameter to said transmitter, whereby the transmitter uses said selected parameter for a next signal to said second network element.

Preferably, the identification label for said selected group is only communicated from said first network element to said second network element when there is a change in said selected group.

Preferably, the communications system is a wireless system, which may be a cellular mobile system.

The first network element is a base station and the second network element may be a handset.

The invention is also directed to a signal for controlling a communications link comprising a first identification label and a second identification label, wherein said first identification label identifies a group of transmission parameters and said second identification label identifies a selected transmission parameter from said group.

The invention is further directed to a computer program on a machine readable format for controlling a communications link, said computer program comprising the steps of:

receiving information on the quality of a communications link;

based on said information, selecting from a plurality of transmission parameters, a group of transmission parameters and a parameter from said group, wherein each said group and each said parameter has an identification label; and outputting the identification labels for said selected group and said selected parameter from said group.

Other aspects of the invention include software for carrying out (which encompasses controlling) the method steps. This acknowledges that such software can be a valuable, separately tradable commodity. A controller in the form of software is intended to encompass software which runs on or controls "dumb" or standard hardware, to carry out the desired functions, (and therefore the software essentially defines the functions of the controller, and can therefore be termed a controller, even before it is combined with its standard hardware). For similar reasons, it is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Reference will now be made, by way of example, to the accompanying drawings, in which.

DETAILED DESCRIPTION OF INVENTION

Embodiments of the present invention are described below by way of example only. These examples represent the best ways of putting the invention into practice that are currently known to the Applicant although they are not the only ways in which this could be achieved.

Figure 1:
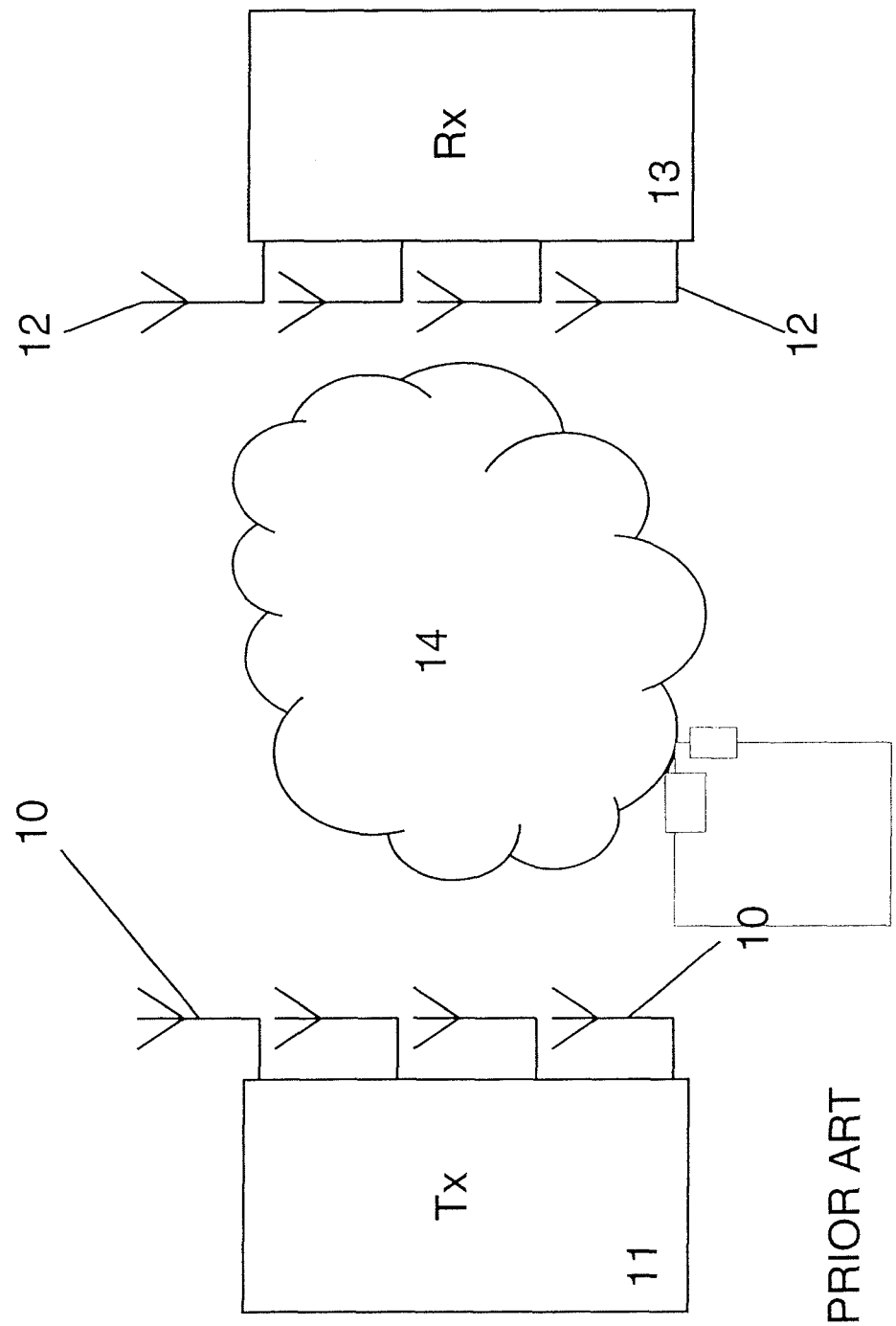
FIG. 1 shows a schematic diagram of a Prior Art MIMO wireless communication system.
Figure 2:
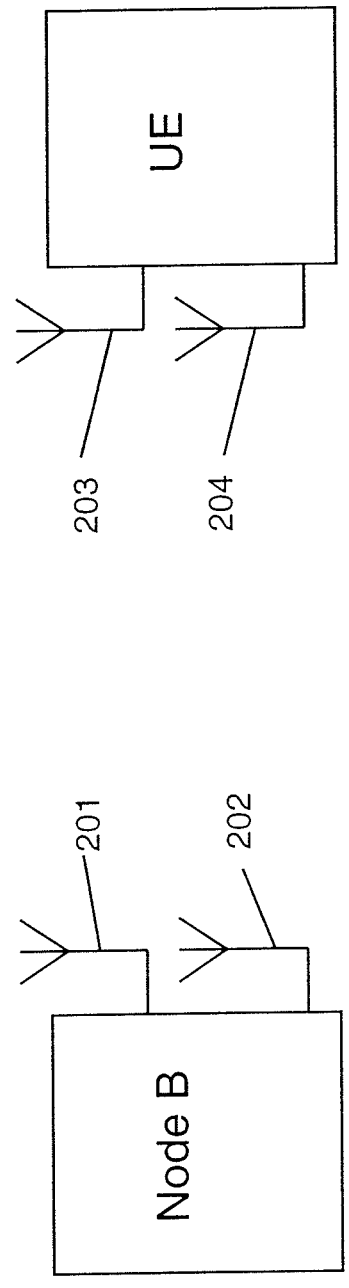
FIG. 2 shows a schematic diagram of a MIMO system.
Figure 3:
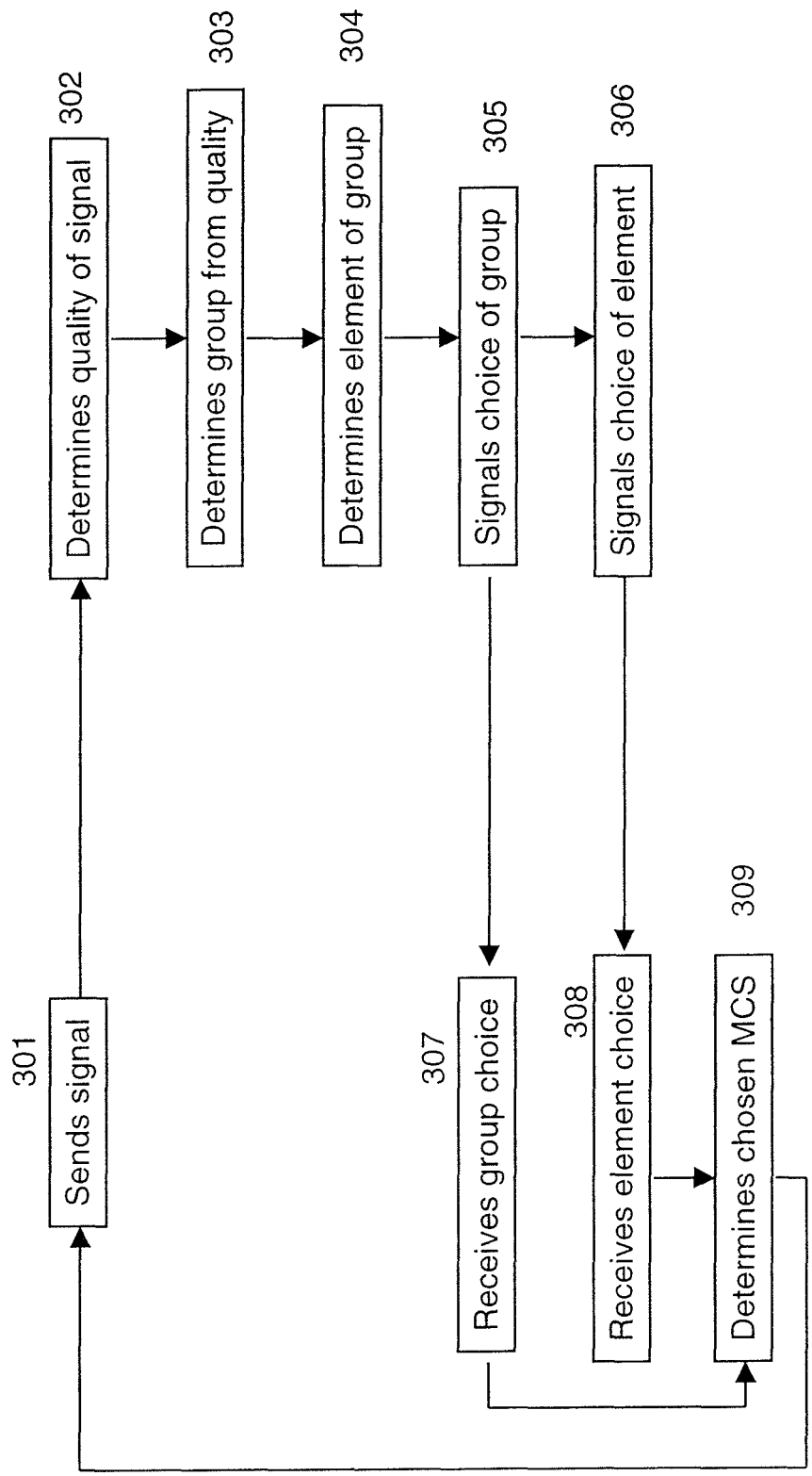
FIG. 3 is a diagram showing the steps of a method of determining the AMC configuration for a communications link according to the present invention.
Figure 4:
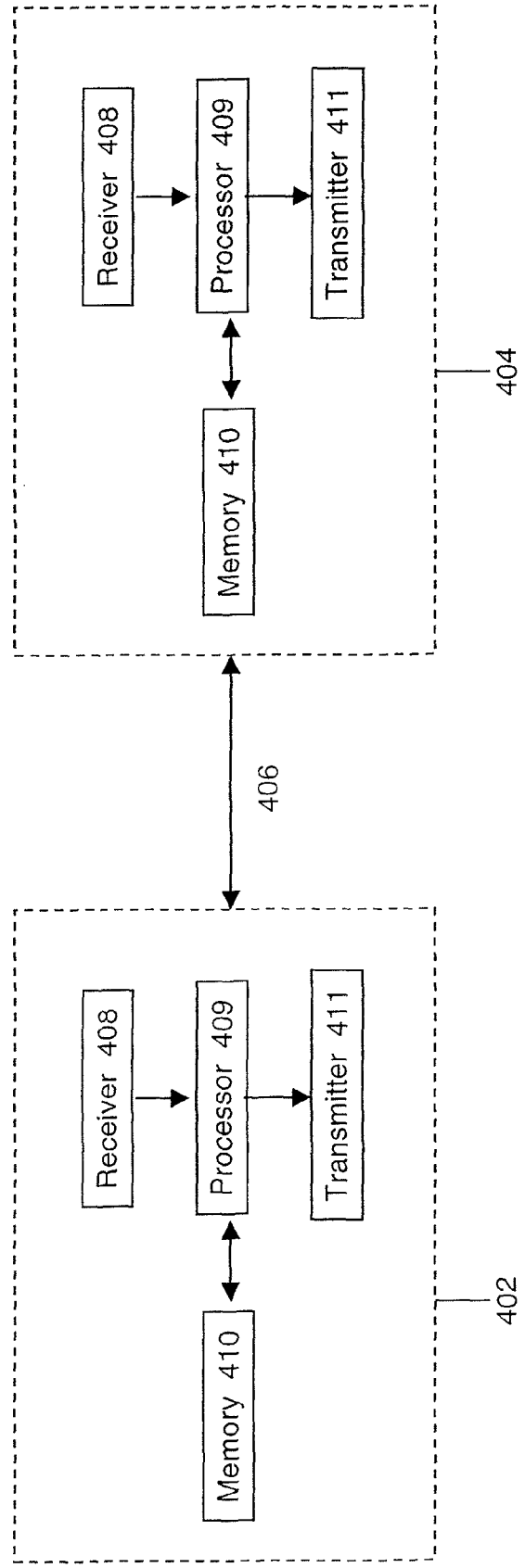
FIG. 4 shows a communications system capable of carrying out the method shown in FIG. 3.

An example of the present invention is shown with reference to FIGS. 2-4.

FIG. 2 shows a MIMO (multiple input multiple output) system with 2 Node B antennas 201, 202 and 2 User Equipment (UE) antennas 203, 204. This system is referred to as a 2:2 system. An x:y system would have x Node B antennas and y UE antennas. Using the coding and modulation options proposed by Lucent, each antenna can be off, or transmit using QPSK at ¼, ½ or ¾ rate, or 16QAM at ½ or ¾ rate, which leads to 36 combinations in total ($6^2$ combinations). In addition, if only one antenna is transmitting, then QPSK at ½ rate can also be used with a factor of 2 or 4 symbol repetition which gives 4 extra combinations. For this system, there are therefore 40 different modulation and coding scheme (MCS) combinations.

This set of 40 combinations, as proposed by Lucent in their PARC system, is shown by way of example only. Other coding and modulation options could be used in which case the signalling bandwidth reduction benefit could become greater, i.e. where the invention is used to select MCS from a set of combinations which has many more than 40 elements.

These 40 different MCS are divided into multiple (typically overlapping) groups. These groups are smaller than the single fixed set used in the PARC scheme (32 configurations for a 2:2 system), and therefore they require less feedback signalling in order to select a member.

Both the Node B (transmitter) and the receiver (UE) must contain look-up information on the groups and the elements within each group. The UE must be able to determine which group and element to request and know the appropriate identification number(s) or label(s) to signal to the Node B via a feedback channel. The Node B must know what MCS is required from the identification label(s) which it receives from the UE. The UE must then know what MCS is being used by the Node B in order that it can decode the data received. This information is transmitted on the downlink as follows. The user requests an MCS based on channel measurements. If the base receives this message and acts upon it then it will change to the requested mode. Whether this happened or not, the base will include a message on the downlink indicated what MCS it is using. In this way, if the request is not acted upon for any reason (e.g. it never arrived) the user still knows what MCS the base is using. This message is always signalled in a known manner so that the user always knows how to read it, so that it can then in turn use the correct demodulation/decoding techniques to extract the main traffic data.

The possible MCS are divided into groups according to which MCS are useful in a particular situation. The groups are not usually exclusive and may also contain an element or elements which are used to signify a change of active group from one to another. For example, there is a correlation between which MCS are useful and the interference level seen by the receiver (this is related to the receiver's location within the system/cell). This allows each MCS group to be optimised for a particular mean relative interference level. As the receiver moves through the system, for example in a mobile cellular system, the long term changes in average interference levels are used to determine which group is to be used. The short term channel conditions are used to determine which member of the current group is to be used. In this example, although signalling is required to request changes of groups, this signalling is minimal as group changes only happen relatively infrequently based on longer terms channel changes due to e.g. movement of the user through the system coverage area.

There are a number of different options for the change of group signalling strategy and examples are given below.

The groups can be ranked in order of the increasing or decreasing mean interference level for which they are optimised. The group selection signalling can then be reduced to an 'up' or 'down' command to request the 'next' or 'previous' group. Further to this two entries from each group can be reserved to specify 'next group' and 'previous group', thus removing the need for a separate signalling sub-channel for group selection To reduce further the amount of signalling required for group signalling, for every nth transmission those entries indicate 'next' and 'previous', but for the other (n−1) transmissions they would specify an entry in the current group. This technique allows the group selection signalling overhead to be made arbitrarily small, at the expense of limiting the rate at which the groups can be changed between. As changing between groups is intended to occur based on longer term channel parameter changes, then a slow rate of change is unlikely to be a concern.

By arranging the transmission parameters, such as MCS into groups according to which are useful for particular channel conditions, the robustness of the link is improved. Within standard PARC if there is an error in the transmission or receipt of the information which identifies the MCS chosen, this error can result in the transmitter using any of the 32 MCS. Some of these 32 MCS will result in a seriously degraded signal. However, within this invention, an error can only result in the use of another MCS within the group, or a change in group. As adjacent groups are likely to have significant overlap in their members, the identifying code numbers or labels for shared members could be made to be identical. In this case, even if the group is inadvertently changed, subsequent MCS requests will frequently result in the correct MCS being selected, even prior to the error being corrected. As configurations have been arranged into groups according to applicability for a given channel condition, use of the wrong MCS is more likely to result in a signal which is still usable than in the case where MCS is directly requested.

In order to minimise the risk from errors in the feedback signal which selects the required MCS, it is possible to use a form of forward error correction (FEC) or parity check bit. Use of parity check bits is well known within communications. The parity check bit allows the network element which receives the signal to confirm whether an error has occurred during transmission. In the situation where the network element knows it has received an error in the transmission, it can therefore continue to use the same MCS until the next signal without an error is received.

A method of choosing the MCS for a communications link, such as the MIMO system of FIG. 2, is shown in FIG. 3. The transmitter sends a signal to the receiver 301. This signal may be a data signal or a dedicated set up signal if this is the first communication to the receiver in question. From the received signal, the receiver determines the quality of the communications link 302 and then based on this quality decision the receiver chooses the appropriate group of MCS 303 and the appropriate element from within that group 304. The receiver then signals to the transmitter the identification labels for the group and element chosen, 305, 306. The transmitter receives this information 307, 308 and from this determines the exact MCS which is required for the next signal to be sent to the receiver 309. This can then continue in a cycle.

In the situation where the group selection signalling is implemented by an 'up' or 'down' command as described earlier, the transmitter will still receive an identification label for the group and the element. However, the selection of the group may be separated in time from the selection of the element. Furthermore, as described earlier, the selection of the group may be made infrequently compared to the selection of an element from the group.

When communication is initiated between a transmitter and a receiver, it is not necessary for a signal to be sent from the transmitter to the receiver to allow a quality determination to be made by the receiver. This is one possible technique, but other options include, but are not limited to, direct input by a user and use of a value from a previous communication.

The term 'network element' is used herein to represent any element which is used within a communications network to send or receive signals. Examples of network elements include, but are not limited to, base stations, terminals, handsets and mobile switching centres.

The term 'transmitter' is used herein to represent any apparatus which is capable of transmitting signals. Examples of transmitters include, but are not limited to, base stations, terminals, handsets and mobile switching centres.

The term 'receiver' is used herein to represent any apparatus which is capable of receiving signals. Examples of receivers include, but are not limited to, base stations, terminals, handsets and mobile switching centres.

The identification label for a group or parameter could be an alphanumeric character or string of characters, a code, a symbol or other indentifier.

A communications system capable of carrying out the method of FIG. 3 is shown in FIG. 4. FIG. 4 shows two network elements 402, 404 connected by a communications link 406. These network elements may be a Node B and a UE as shown in FIG. 2.

Each of the two network elements 402, 404 comprise the same essential constituents: a receiver 408, a processor 409, a memory 410 and a transmitter 411.

Referring now to network element 402, the operation of the constituents is described. The transmitter 411 is capable of sending signals to the other network element 404 via the communications link 406 (method step 301). The receiver 408 is capable of receiving signals from the other network element 404 via the link 406. The processor 409 determines from the received signal, the chosen group and element from the group (method steps 307, 308). The processor 409 interacts with the memory 410 to determine the required transmission parameter (method step 309) and interacts with the transmitter 411 to ensure that this chosen parameter is used for the next transmission to network element 404. The memory 410 contains a look-up table or other means which links the identification numbers or symbols sent by network element 404 to represent the chosen group and element and the transmission parameters themselves, e.g. the MCS details. The processor may be implemented in any way known to a skilled man, including but not limited to a solid state device, an FPGA and a computer program. The memory may be implemented in any way known to a skilled man, including but not limited to a database on a computer and a solid state device. The processor and the memory may be combined into a single element which may be implemented in hardware, software or firmware.

Referring now to network element 404, the operation of the constituents is described. The receiver 408 is capable of receiving signals from network element 402 via the communications link 406. The receiver 408 and/or the processor 409 is capable of determining the quality of the link 406 (method step 302). The processor 409 is also capable of determining the required group and element within the group from the quality determination by interacting with the memory 410, (method steps 303, 304). The memory 410 contains a look-up table, a formula or other means which enables the processor to link the quality determination to the appropriate identification numbers or symbols which should be sent to network element 402 in order that the optimum transmission parameter is selected. The transmitter 411 is capable of sending signals to network element 402 via the link 406, and the transmitter sends details of the selected group and element (method steps 305, 306).

There are many techniques well known in the art for determining the quality of a communications link. Quality decisions can be based on parameters including, but not limited to, mean interference level, SNIR, error rate, channel dispersion and fading characteristics. Using SINR has benefits because this quantity will already be being measured at the terminal and is thus known data. It can also be estimated relatively rapidly, (compared to error rate which is very slow to measure).

One example is that the terminal would look at the current SNIR estimate (and/or other metrics) and it would use this value to update a longer term average SNIR estimate. Based on the longer term average it would determine which group it wanted to use (i.e. whether a group change was required). From the current SNIR estimate it would determine which element from the current group it wanted to use. This information would be sent back to the base via the feedback channel to request an MCS.

The description above has considered MCS to be specifying modulation order, code rate, and symbol repetition, for each transmitter antenna individually, in the most general case. This is shown by way of example only, and other transmission parameters may be used. Other information that may be sent back from the terminal to the base (aside from the user traffic data) includes things such as ARQ messages (requests for resend of data that was corrupted), power control commands, and requests for handover, and the invention may also be applied in these circumstances.

In summary, this invention can be useful whenever there is some parameter which meets the following criteria:—
1. It can potentially be required to be any of a large number of values, dependent upon some outside parameter.
2. These values can be ordered in some manner based on this parameter.
3. The parameter only varies over a limited range in the short term
4. The parameter varies over either the full or a large range in the long term.

The group selection can be seen as setting the rough value of the parameter, and the selection from within the current group as providing the final adjustment to the desired value. Controlling the parameter via these two mechanisms together can be more efficient than explicitly specifying the parameter in full, to the same level of accuracy. This invention is particularly beneficial when the gross value of the parameter is known/expected to vary relatively slowly. The efficiency improvement is achieved by exploiting temporal correlation (coherence) of the parameter being controlled. If there is no such correlation then this technique will offer less benefit. For the purposes of controlling MCS, there is coherence because the desired MCS is tied to the SNIR conditions on the channel, which do exhibit temporal coherence in general.

Although the specific examples described above relate to wireless communications links, it would be apparent to the skilled person that the techniques could be applied to any communications link, including but not limited to optical links, copper links, coaxial links or multiple links including one or more technologies.

Furthermore the feedback signal may be communicated by a separate communications link from the data link. For example in an optical system the transmission parameter might be the gain of an amplifier or the transmission wavelength. In some network architectures the amplifier or transmitter may not have means for detecting an optical signal and therefore the feedback would be sent via an electrical link. Such an electrical link has limited capacity compared to the optical data link and therefore use of this invention is advantageous.

Any range or device value given herein may be extended or altered without losing the effect sought, as will be apparent to the skilled person for an understanding of the teachings herein.

The invention claimed is:

1. A method of operating an apparatus comprising a receiver, the method comprising the apparatus:
   estimating a quality of a communications link from a transmitter to the receiver;
   based on the estimated quality of the communications link, selecting, from a plurality of groups of transmission parameters, a group of transmission parameters;
   based on the estimated quality of the communications link, selecting at least one transmission parameter from the selected group of transmission parameters,
   wherein a set of transmission parameters is divided into the plurality of groups of transmission parameters, each group of transmission parameters in the plurality of groups of transmission parameters including fewer elements than the set of transmission parameters, and wherein at least one group of transmission parameters in the plurality of groups of transmission parameters includes a plurality of transmission parameters;
   communicating to the transmitter identification of the at least one selected transmission parameter from the selected group of transmission parameters; and
   communicating to the transmitter, when there is a change of the selected group of transmission parameters, identification of the selected group of transmission parameters,
   wherein selecting the group of transmission parameters is performed less frequently than selecting the at least one transmission parameter from the selected group of transmission parameters.

2. The method of claim 1, wherein the at least one selected transmission parameter from the selected group of transmission parameters comprises only one selected transmission parameter.

3. The method of claim 1, wherein at least one parameter within each group of transmission parameters represents a request to change the selected group of transmission parameters.

4. The method of claim 1, wherein:
   selecting the group of transmission parameters based on the estimated quality of the communications link comprises selecting the group of transmission parameters based on longer term changes in the quality of the communications link; and selecting at least one transmission parameter from the selected group of transmission parameters based on the estimated quality of the communications link comprises selecting the at least one transmission parameter based on shorter term changes in the quality of the communications link.

5. A method of operating an apparatus comprising a transmitter, the method comprising the apparatus:

receiving from a receiver identification of at least one selected transmission parameter from a selected group of transmission parameters;

receiving from the receiver, when there is a change of the selected group of transmission parameters, identification of the selected group of transmission parameters, wherein the selected group of transmission parameters is selected less frequently than the at least one selected transmission parameter is selected from the selected group of transmission parameters;

based on the received identifications, determining a modulation and coding scheme to be used for a communications link between the transmitter and the receiver; and transmitting to the receiver via the communications link using the determined modulation and coding scheme, wherein a set of transmission parameters is divided into a plurality of groups of transmission parameters, each group of transmission parameters in the plurality of groups of transmission parameters including fewer elements than the set of transmission parameters, and wherein at least one group of transmission parameters in the plurality of groups of transmission parameters includes a plurality of transmission parameters.

6. The method of claim 5, wherein the at least one selected transmission parameter from the selected group of transmission parameters comprises only one selected transmission parameter.

7. The method of claim 5, wherein at least one transmission parameter within each group of transmission parameters represents a request to change the selected group of transmission parameters.

8. The method of claim 5, wherein:

the selected group of transmission parameters is selected based on longer term quality changes of the communications link; and the at least one selected transmission parameter from the selected group of transmission parameters is selected based on shorter term quality changes of the communications link.

9. An apparatus, comprising:

a receiver;

a processor operable to cause the apparatus to:

estimate a quality of a communications link from a remote transmitter to the receiver, based on the estimated quality of the communications link, select from a plurality of groups of transmission parameters, a group of transmission parameters, and based on the estimated quality of the communications link, select at least one transmission parameter from the selected group of transmission parameters, wherein a set of transmission parameters is divided into the plurality of groups of transmission parameters, each group of transmission parameters in the plurality of groups of transmission parameters including fewer elements than the set of transmission parameters, and wherein at least one group of transmission parameters in the plurality of groups of transmission parameters includes a plurality of transmission parameters; and a transmitter operable to communicate to the remote transmitter identification of the at least one selected transmission parameter from the selected group of transmission parameters and, when there is a change of the selected group of transmission parameters, identification of the selected group of transmission parameters, wherein the processor is operable to cause the apparatus to select the group of transmission parameters less frequently than the at least one transmission parameter from the selected group of transmission parameters.

10. The apparatus of claim 9, wherein the at least one selected transmission parameter from the selected group of transmission parameters comprises only one selected transmission parameter.

11. The apparatus of claim 9, wherein at least one transmission parameter within each group of transmission parameters represents a request to change the selected group of transmission parameters.

12. The apparatus of claim 9, wherein the processor is operable to cause the apparatus to:

select the group of transmission parameters based on the estimated quality of the communications link by selecting the group of transmission parameters based on longer term changes in the quality of the communications link; and select the at least one transmission parameter from the selected group of transmission parameters based on the estimated quality of the communications link by selecting the at least one transmission parameter based on shorter term changes in the quality of the communications link.

13. An apparatus, comprising:

a transmitter;

a receiver operable to receive, from a remote apparatus, identification of at least one selected transmission parameter from a selected group of transmission parameters and, when there is a change of the selected group of transmission parameters, identification of the selected group of transmission parameters, wherein the selected group of transmission parameters is selected less frequently than the at least one selected transmission parameter is selected; and a processor operable to cause the apparatus to:

based on the received identifications, determine a modulation and coding scheme to be used for a communications link between the transmitter and a receiver of the remote apparatus; and transmit to the receiver of the remote apparatus via the communications link using the determined modulation and coding scheme, wherein a set of transmission parameters is divided into a plurality of groups of transmission parameters, each group of transmission parameters in the plurality of groups of transmission parameters including fewer elements than the set of transmission parameters, and wherein at least one group of transmission parameters in the plurality of groups of transmission parameters includes a plurality of transmission parameters.

14. The apparatus of claim 13, wherein the at least one selected transmission parameter from the selected group of transmission parameters comprises only one selected transmission parameter.

15. The apparatus of claim 13, wherein at least one transmission parameter within each group of transmission parameters represents a request to change the selected group of transmission parameters.

16. The apparatus of claim 13, wherein:
the selected group of transmission parameters is selected based on longer term quality changes of the communications link; and
the at least one selected transmission parameter from the selected group of transmission parameters is selected based on shorter term quality changes of the communications link.

\* \* \* \* \*